US012626857B2

(12) United States Patent
Daneryd et al.

(10) Patent No.: US 12,626,857 B2
(45) **Date of Patent: *May 12, 2026**

(54) TRANSFORMER ARRANGEMENT

(71) Applicant: Hitachi Energy Ltd, Zürich (CH)

(72) Inventors: Anders Daneryd, Västerås (SE); Kiran Chandra Sahu, Västerås (SE)

(73) Assignee: Hitachi Energy Ltd, Zürich (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/839,280

(22) PCT Filed: Jan. 31, 2023

(86) PCT No.: PCT/EP2023/052252

§ 371 (c)(1),
(2) Date: Aug. 16, 2024

(87) PCT Pub. No.: WO2023/160960

PCT Pub. Date: Aug. 31, 2023

(65) Prior Publication Data

US 2025/0111988 A1 Apr. 3, 2025

(30) Foreign Application Priority Data

Feb. 25, 2022 (EP) .................................... 22158980

(51) Int. Cl.
*H01F 27/02* (2006.01)
*H01F 27/32* (2006.01)
(Continued)

(52) U.S. Cl.
CPC ............. *H01F 27/33* (2013.01); *H01F 27/02* (2013.01); *H01F 27/321* (2013.01); *H01F 27/327* (2013.01); *H01F 27/36* (2013.01)

(58) Field of Classification Search
CPC ......... H01F 27/33; H01F 27/327; H01F 27/36
(Continued)

(56) References Cited

U.S. PATENT DOCUMENTS 3,175,173 A 3/1965 Welch
3,260,974 A * 7/1966 Specht .................... H01F 27/33
174/15.1

(Continued)

FOREIGN PATENT DOCUMENTS

CN 201732653 U 2/2011
CN 104465049 A 3/2015

(Continued)

OTHER PUBLICATIONS

International Search Report and Written Opinion of the International Searching Authority, International Application No. PCT/EP2023/052252, mailed Mar. 31, 2023, 17 pages.

(Continued)

*Primary Examiner* — Tuyen T Nguyen
(74) *Attorney, Agent, or Firm* — Sage Patent Group

(57) ABSTRACT

The disclosure relates to a transformer arrangement comprising a transformer which comprises at least one phase winding. The phase winding has coil turns around a coil axis. The transformer arrangement further comprises a transformer tank having walls forming an enclosure in which the transformer is arranged. The enclosure contains an incompressible medium in which the transformer is immersed. A screen is arranged in the transformer tank, between the walls of the transformer tank and the at least one phase winding of the transformer. The screen has an inner, transformer-facing, surface and an outer, wall-facing, surface. The transformer tank has a first wall extending transversely to a first axis adjacent to a first end of the transformer and an opposite second wall extending transversely to the first axis, adjacent to a second end of the transformer.

6 Claims, 4 Drawing Sheets

(51) Int. Cl.
*H01F 27/33* (2006.01)
*H01F 27/36* (2006.01)

(58) Field of Classification Search
USPC .......................................... 336/55–62, 90, 92
See application file for complete search history.

(56) References Cited

U.S. PATENT DOCUMENTS

| | | | | |
|---|---|---|---|---|
| 4,146,112 | A * | 3/1979 | Usry | H01F 27/02 336/59 |
| 4,373,608 | A | 2/1983 | Holmes | |
| 2015/0256061 | A1 | 9/2015 | Koji et al. | |
| 2017/0047154 | A1 | 2/2017 | Liu et al. | |
| 2017/0365401 | A1 | 12/2017 | Kim et al. | |

FOREIGN PATENT DOCUMENTS

| | | | |
|---|---|---|---|
| CN | 105810419 | A | 7/2016 |
| CN | 113571307 | A | 10/2021 |
| EP | 0073401 | A1 | 3/1983 |
| JP | S58168115 | U | 11/1983 |
| JP | H01220414 | A | 9/1989 |
| JP | H07249530 | A | 9/1995 |
| JP | H0845751 | A | 2/1996 |
| JP | H10 106854 | A | 4/1998 |
| JP | H11340056 | A * | 12/1999 |
| JP | 2014107442 | A | 6/2014 |
| JP | 2015121714 | A | 7/2015 |
| JP | 2017011140 | A | 1/2017 |
| SE | 1651719 | A1 | 12/2016 |
| WO | 01/01425 | A1 | 1/2001 |
| WO | 2008080820 | A1 | 7/2008 |

OTHER PUBLICATIONS

International Preliminary Report on Patentability, International Application No. PCT/EP2023/052252, mailed Feb. 27, 2024, 17 pages.
Extended European Search Report, European Application No. 22158980.7, mailed Sep. 7, 2022, 11 pages.
Chinese Notice of Allowance and English Translation, Chinese Application No. 202380023541.3, mailed Jan. 2, 2025, 6 pages.
Japanese Office Action and English Translation, Japanese Patent Application No. 2024-550292, mailed Mar. 11, 2025, 8 pages.
Japanese Decision to Grant and English Translation, Japanese Patent Application No. 2024-550292, mailed Sep. 16, 2025, 6 pages.
United States Office Action, U.S. Appl. No. 18/838,067, mailed Oct. 28, 2025, 8 pages.

* cited by examiner

TRANSFORMER ARRANGEMENT

CROSS-REFERENCE TO RELATED APPLICATIONS

This application is a 35 U.S.C. § 371 national stage application of PCT International Application No. PCT/EP2023/052252 filed on Jan. 31, 2023, which in turn claims priority to European Patent Application No. 22158980.7, filed on Feb. 25, 2022, the disclosures and content of which are incorporated by reference herein in their entireties.

TECHNICAL FIELD

The present disclosure relates to a transformer arrangement for load-noise reduction.

BACKGROUND

Transformers must comply with various requirements on noise levels. Transformers immersed in electrically insulating oil in transformer tanks vibrate during operation. The vibrations are transferred from the transformer windings, via the oil, to the tank walls, which can lead to significant vibrational displacement of the tank walls, which in turn results in generation of noise. Three main sources of noise can be identified in transformers: no-load noise, or core noise, generated by magnetostriction, load noise produced by electromagnetic forces in the windings, and noise due to auxiliary equipment such as fans and pumps used in the cooling system. Out of these three, load noise has significant contribution to the total noise, especially for large units.

Today's solutions to reduce noise are inefficient and costly and are being applied far away from the source and primary transmission path of load noise. The conventional solutions are often also bulky and impractical, such as sound panels and damping layers attached to the outside of the tank walls. Filling tank structural elements with sand is another low noise solution, but primarily for core noise, and with limited effect on load noise. Conventional solutions are difficult to optimize and standardize for off-the-shelf everyday design work because of the complex vibration/radiation properties of transformer tanks in which the transformers are enclosed. Sometimes there are also significant unit-to-unit variations.

According to its abstract, WO0101425 relates to a sound-insulating device for a stationary induction machine with an active part, an insulating fluid surrounding the active part, and a tank enclosing the insulating fluid. The sound-absorbing device comprises a gas-filled cavity and a resilient membrane surrounding the gas-filled cavity, thus obtaining a sound-insulating device which is extremely compressible. In the induction machine, the device is arranged between the active part and the tank of the induction machine and spaced from the inside of the tank. The sound-insulating device may have an extent in one plane, whereby the device has a membrane portion facing the active part and a membrane portion facing the tank. In some embodiments, at least one of the membrane portions has at least one corrugated region, and a spacing membrane is arranged in the cavity making contact with the membrane portion at least two points.

According to its abstract, JPH10106854 relates to stationary induction electrical equipment which can reduce noise even when the constitution of the equipment is made compact. A resonance type silencer which has a partly formed opening an internal cavity is provided on the internal surface of a tank. Since the silencer is set at the frequency which resonates to the frequency of noise produced in the tank, the silencer can reduce the noise produced in the tank by resonating to the frequency of the noise. Therefore, the noise radiated to the outside from the tank can be reduced.

According to its abstract, CN201732653 relates to a sound-proof oil tank structure of a transformer, comprising an oil tank body, wherein the inner wall of the oil tank body is provided with a composite damping steel plate; when the inner wall of the oil tank body is provided with a magnetic shield, the inner side and the outer side of the magnetic shield are respectively provided with two layers of composite damping steel plates which are pressed tightly by clamping plates of the magnetic shield; and when the inner wall of the oil tank body is not provided with the magnetic shield, the composite damping steel plates are fixed by installation seats at the inner wall of the oil tank body. By arranging the composite damping steel plates at the inner wall of the oil tank body of the transformer, the noise of the transformer body is effectively reduced. The sound-proof oil tank structure of the transformer has simple structure, and convenience in manufacture and installation.

According to its abstract, CN105810419 relates to a noise reduction apparatus for a transformer, a transformer oil tank and the transformer. The noise reduction apparatus comprises a noise reduction plate, and an insulating layer for covering the surface of the noise reduction plate, wherein the noise reduction plate comprises at least two paperboard layers, and a metal plate layer arranged between adjacent paperboard layers; and in addition, the topmost layer and the lowest layer of the noise reduction plate are both paperboard layers. The noise reduction apparatus has the advantages of low cost and good noise reduction effect; in addition, the noise reduction apparatus can be arranged in an idle space in the transformer oil tank, so that line avoidance and enlarging of the volume of the transformer are not required; meanwhile, the inner wall of the transformer is flat and straight, so that the structure of the noise reduction apparatus can be simplified; and therefore, the noise reduction apparatus is easy to machine and easy to realize industrial production.

According to its abstract, EP0073401 relates to screening walls supported on the tank side walls via large-area compressible intermediate layers and at the same time represent insulating walls for reducing the noise emission, since the natural frequency of the vibrating systems, consisting in each case of the parts of the screening walls located between the attachment points and the associated parts of the intermediate layer, is less than 0.7 times the mains frequency. The use of this arrangement is particularly economically applicable in high-power transformers.

According to its abstract, JP2017011140 relates to a transformer capable of reducing noises therefrom by improving a fixing method of a magnetic shield disposed inside a transformer tank. The transformer is constituted of: an iron core which has an iron core leg and an iron core yoke; a winding wound on the iron core leg; a tank that has the iron core and the winding therein; and a magnetic shield disposed inside the tank opposing the winding. After fixing a seat on the inner surface of the tank, a buffer member is disposed on the seat, and a magnetic shield is fixed to a buffer member.

U.S. Pat. No. 3,175,173 relates to means for reducing the audible noise generated during normal operation by electrical apparatus, and more specifically to noise reducing arrangements for electrical induction apparatus of the type having a flux producing member contained in a metallic enclosure.

According to its abstract, U.S. Pat. No. 4,373,608 relates to a tuned sound barrier for machines which radiate sound primarily at a few constant, discrete frequencies includes an array of mechanical resonators distributed over the surface of a sound barrier. Each resonator of the array is tuned to present a high mechanical impedance to transmission of mechanical vibration at one of the discrete frequencies emitted by the source machine. The tuned sound barrier may be either a free-standing sound barrier or an attachment to a housing for the machine.

According to its abstract, WO2008080820 relates to a power transformer/reactor immersed in oil comprising transformer/reactor core and windings accommodated in a tank comprising tank base plate and tank walls, a foundation supporting the tank. An elongated continuous band forming a closed frame is arranged between the base plate and the foundation and the outer periphery of the base plate extends outside the inner periphery of the frame and thereby enclosing an air volume within the frame, the base plate and foundation. The tank, support reduces the sound emitted from the transformer/reactor.

According to its abstract, SE1651719 relates to solutions to low frequency sound attenuation around electrical machines. The general solution is to enclose the machine with walls with sufficiently high mass without high costs. The first aspect of the invention with sand filled panels is to reduce noise with high efficiency at low frequencies especially at 100 Hz and 120 Hz. This corresponds to the load noise for main stream AC-transformers and to the sound generated by the Maxwell forces for shunt reactors.

SUMMARY

Therefore, an object of the disclosure is to provide an improved transformer arrangement showing reduced noise radiation. More specifically, an object of the disclosure is to provide a transformer arrangement which is able to reduce load noise.

According to a main aspect of the disclosure, the object is achieved by a transformer arrangement comprising a transformer which comprises at least one phase winding. The phase winding has coil turns around a coil axis. The transformer arrangement further comprises a transformer tank having walls forming an enclosure in which the transformer is arranged. The enclosure contains an incompressible medium in which the transformer is immersed. A screen is arranged in the transformer tank, between the walls of the transformer tank and the at least one phase winding of the transformer. The screen has an inner, transformer-facing, surface and an outer, wall-facing, surface. The screen is further arranged distanced from the at least one phase winding of the transformer. The transformer has a first extension along a first axis parallel with the coil axis, a second extension along a second axis and a third extension along a third axis. The first, second and third axes are perpendicular to each other. The transformer has lateral sides parallel with the coil axis, and a first end along the first axis and an opposite second end along the first axis. The transformer tank has a first wall extending transversely to the first axis adjacent to the first end of the transformer and an opposite second wall extending transversely to the first axis, adjacent to the second end of the transformer. The screen has at least one first part and at least one second part, each extending transversely to the first axis and wherein the at least one first part is arranged between the first end of the transformer and the first wall of the transformer tank and the at least one second part is arranged between the second end of the transformer and the second wall of the transformer tank.

Studies indicate that the main mechanisms behind oil mechanically exciting the tank walls are related to, on the one hand, oil incompressibility, and on the other hand oil inertia. Oil being acoustically incompressible means that any volumetric change brought about by vibration of the windings will inevitably translate into the same volumetric change of the tank. The net tank volume change is in turn realized by the structural modes of the tank organizing themselves in such a way that a net volume change is established. Such a net volume change may, at low frequencies, be thought of as the result of a so-called monopole tank velocity distribution and this global distribution is known to have such a high radiation efficiency that it may overshadow the noise contribution from other local tank modal noise contributions. The latter sometimes referred to as volume-preserving local dipole distributions having much lower radiation efficiency than the global monopole one.

The fact that the entire oil volume can be considered acoustically incompressible also implies that its inertia plays an important role in that the volume is nothing but a large acoustic reactive nearfield, which means that oil excites the tank by its inertia-forces, rather than by pressure due to compressibility. An incompressible medium is a medium whose volume or density does not change with pressure. True incompressibility exists only in theory. However, the meaning of the term "incompressible", as used in the present disclosure, is a term which denotes a nearly incompressible medium in the frequency range of interest for the present disclosure. The medium may, in the present disclosure, be an electrically insulating medium, such as mineral oil.

Generally, one way of mitigating the noise-radiating mechanism of the transformer tank walls is to insert a barrier between the windings and the tank walls in order to shield the tank walls from the inertia-forces of the incompressible medium. By the disclosed transformer arrangement, a noise-reducing screen is arranged between the transformer and the transformer tank walls, distanced from the at least one phase winding. Thereby, the screen is separated from direct structural vibrations of the source, i.e. the transformer/phase winding, and is configured to block inertia of the incompressible medium emanating from the phase winding such that vibrations are reduced at the tank wall.

For the purpose of the present disclosure, the transformer is defined to have a height equal to a height of the at least one phase winding. Also, the height of the at least one phase winding is defined to include thicknesses of pressplates at each end of the at least one phase winding. The term "height" is not limited to a vertical extension. It rather denotes an extension generally along the coil axis.

To cover a larger portion of the transmission path of vibrations from the source, the screen may, in addition to the lateral part, have a first part and a second part. The first and second parts may be configured to block inertia-forces of the incompressible medium at the first and second ends of the transformer. In some transformer applications, space is limited along the lateral sides of the transformer. In such cases, first and second parts of the screen may still be arranged at the ends of the transformer.

Optionally, the screen is configured to be free from structural resonances at twice the network frequency.

The network frequency is the frequency at which the transformer is operated, which results in mechanical vibrations at twice the network frequency. The network frequency is usually 50 Hz or 60 Hz. As an example, the screen is thus configured to be free from structural resonances at 100 Hz and/or 120 Hz. In some embodiments, the screen is configured to be free from structural resonances in a range of up to six times the network frequency.

Hereby, a stiff, ideally rigid, screen is arranged as the barrier between the windings and the tank. By rigid is meant that the screen is configured to exhibit structural resonances far beyond twice the network frequency and such that the remaining average static deflection of the screen due to the oscillating inertia-forces of the surrounding incompressible medium is much less than the average particle displacement of the medium. Thereby, inertia-forces of the incompressible medium are not transferred beyond the screen or are at least significantly reduced beyond the screen.

Optionally, the inner surface of the screen comprises a volumetrically compressible lining.

Under the action of electromagnetic forces acting on the transformer structural components, these undergo both a change in shape and a change in volume. The latter is imposed on the incompressible medium to the extent that the same volumetric change is enforced on tank vibrations, leading to a net volume change of the air surrounding the tank, which in turn results in much higher noise levels as compared to when there is a zero net volume change of the tank. This zero net volume change of the tank is here proposed to be brought about by a volumetrically compressible lining which, instead of the tank, takes up the volumetric change of the transformer structural components. Remaining inertia-forces are blocked and reduced by the rigid part of the screen.

Bulk modulus of the lining should be significantly less than the bulk modulus of the surrounding incompressible medium. Bulk modulus describes the elastic properties of a solid or fluid when it is under pressure on all surfaces. Sometimes referred to as the incompressibility, the bulk modulus is a measure of the ability of a substance to withstand changes in volume when under compression on all sides. As an example, the bulk modulus of an electrically insulating transformer oil is approximately 1.7 GPa. In this example, the bulk modulus of the lining may be less, such as around 0.1-0.2 GPa, or even less.

Optionally, the screen comprises a granular material.

The propagation of energy in an acoustic medium can generally be attenuated and redirected by introducing a change of impedance as experienced by the particle motion in the medium and the present disclosure brings about this change in impedance by introducing lump mass in the form of a granular compound, providing an inelastic and highly damped barrier without intrinsic resonances.

As an alternative to the rigid screen, and to the rigid screen comprising a volumetrically compressible lining, the screen may comprise the granular material. The screen may be configured as a plurality of pockets, which pockets comprise the granular material, such as sand. The granular material should be heavier than the incompressible medium. As an example, where an electrically insulating transformer oil has a density of approximately 870 $kg/m^3$, the granular material could have a density of more than 870 $kg/m^3$, and may be at least 1600 $kg/m^3$.

Optionally, the screen may be arranged on the walls of said transformer tank. Accordingly, the screen, comprising the granular material, may be arranged on the inside of the walls of the transformer tank. As such, pockets or bags comprising the granular material may be attached to the walls by conventional fixing means, and may be covering the walls.

Optionally, the screen is arranged distanced from the walls of the transformer tank. Any of the rigid screen, the compound screen or the heavy/soft screen described may be arranged in the transformer tank distanced from both the at least one phase winding of the transformer and from the tank walls. In this manner, the screen is not in direct mechanical contact with neither the phase winding, nor the tank walls. Transfer of mechanical vibrations directly from the at least one phase winding to the screen and directly from the screen to the tank walls is thereby avoided.

Optionally, in any point of the screen, a distance between said point of the screen and a closest part of the at least one phase winding of the transformer is less than a distance between said point of the screen and a closest part of the walls of the transformer tank.

Acoustically, it is advantageous that the screen is arranged as close as possible to the source of vibrations to efficiently block a larger part of inertia-forces emanating from transformer in operation.

Optionally, the transformer has lateral sides parallel with the coil axis, and the screen has at least one lateral part aligned with the lateral sides of the transformer, and wherein the at least one lateral part of the screen circumscribes the transformer along a plane transverse to the coil axis.

The lateral part of the screen is not limited to being aligned in parallel with the lateral sides of the transformer. The lateral part may be inclined with regard to the coil axis.

From a load noise reduction point of view, it would be preferable that the screen completely surrounds the transformer, without any openings in the screen. However, in practice, design considerations require that the incompressible medium may flow around the at least one phase winding relatively freely, for cooling purposes. In addition, the screen needs to enable numerous electrical connections between the transformer and the outside of the transformer tank. Therefore, a lateral part of the screen, which surrounds, or circumscribes, the lateral sides of the transformer, or at least one phase winding, is considered an example configuration of the screen.

BRIEF DESCRIPTION OF THE DRAWINGS

Further objects and advantages of, and features of the disclosure will be apparent from the following description of one or more embodiments, with reference to the appended drawings, where.

DETAILED DESCRIPTION OF EXAMPLE EMBODIMENTS OF THE INVENTION

The present disclosure is developed in more detail below referring to the appended drawings which show examples of embodiments. The disclosure should not be viewed as limited to the described examples of embodiments. Like numbers refer to like elements throughout the description.

Figure 1:
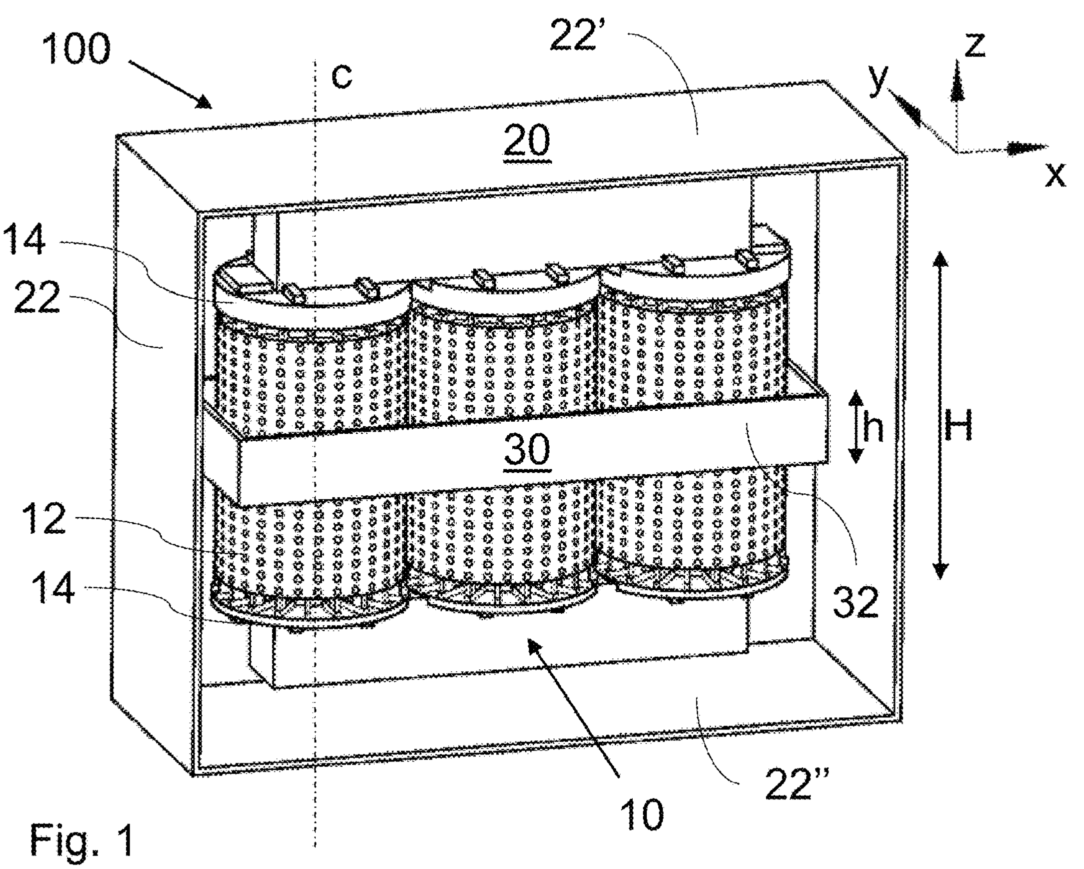
FIG. 1 shows a perspective view of an exemplary embodiment of the present disclosure.

FIG. 1 illustrates a transformer arrangement 100 comprising a transformer 10, which comprises at least one phase winding 12. The illustrated transformer 10 has three phase windings 12. The phase winding 12 has coil turns around a coil axis c. The transformer arrangement 100 further comprises a transformer tank 20 having walls 22 forming an enclosure in which said transformer 10 is arranged. In the illustrated example, the transformer tank 20 is displayed open to the viewer to expose the transformer 10 inside. In practice, the transformer tank is obviously closed on all sides. The enclosure contains an incompressible medium in which the transformer 10 is immersed. A screen 30 is arranged in the transformer tank 20, between the walls 22 of the transformer tank 20 and the at least one phase winding 12 of the transformer 10. The screen 30 has an inner, transformer-facing, surface and an outer, wall-facing, surface. The screen 30 is arranged distanced from the at least one phase winding 12 of the transformer 10. In other words, the screen is not in direct mechanical contact with any phase winding 12 of the transformer 10. Thereby, the screen is separated from direct structural vibrations of the of the at least one phase winding, which vibrations are generated during operation of the transformer. The screen 30 is configured to block inertia-forces of the incompressible medium emanating from the phase winding 12 such that vibrations of the incompressible medium are reduced at the tank walls 22. Consequently, displacement of the tank walls 22, due to movement of the incompressible medium, will also be reduced, which in turn leads to reduced load noise radiated by the tank walls 22.

The transformer operates at a given network frequency. Usually, the network frequency is 50 Hz or 60 Hz, which leads to structural vibrations of the at least one phase winding 12 at twice the network frequency, i.e. at 100 Hz or 120 Hz, respectively. The screen 30 may be configured to be free from structural resonances at twice the network frequency. In some embodiments, the screen 30 is configured to be free from structural resonances in a range of up to six times the network frequency. Thereby, the screen 30 will not be significantly excited by vibrations transferred from the at least one phase winding 12, through the incompressible medium, to the screen 30.

Figure 6:
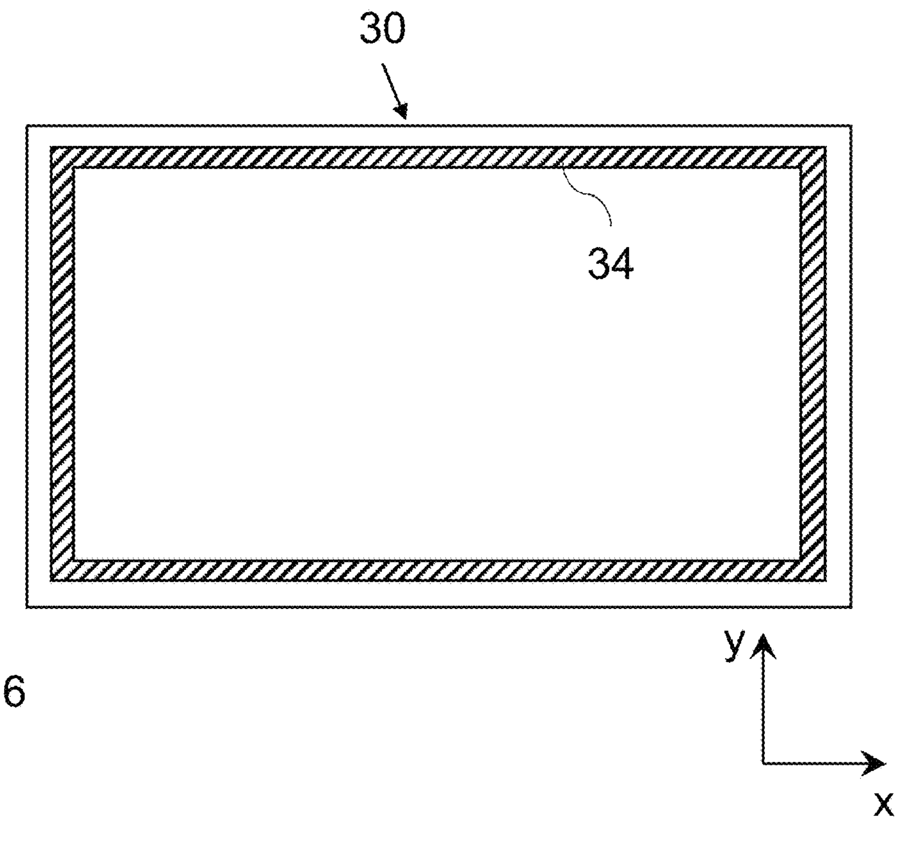
FIG. 6 shows a top-down view of a screen according to an exemplary embodiment of the present disclosure.

Optionally, as shown in FIG. 6, the inner surface of the screen 30 may comprise a volumetrically compressible lining 34. Bulk modulus of the lining should be significantly less than the bulk modulus of the surrounding incompressible medium. As an example, the bulk modulus of an electrically insulating transformer oil is approximately 1.7 GPa. In this example, the bulk modulus of the lining may be less than 1.7 GPa, e.g., 0.1-0.2 GPa, or even less.

Figure 7:
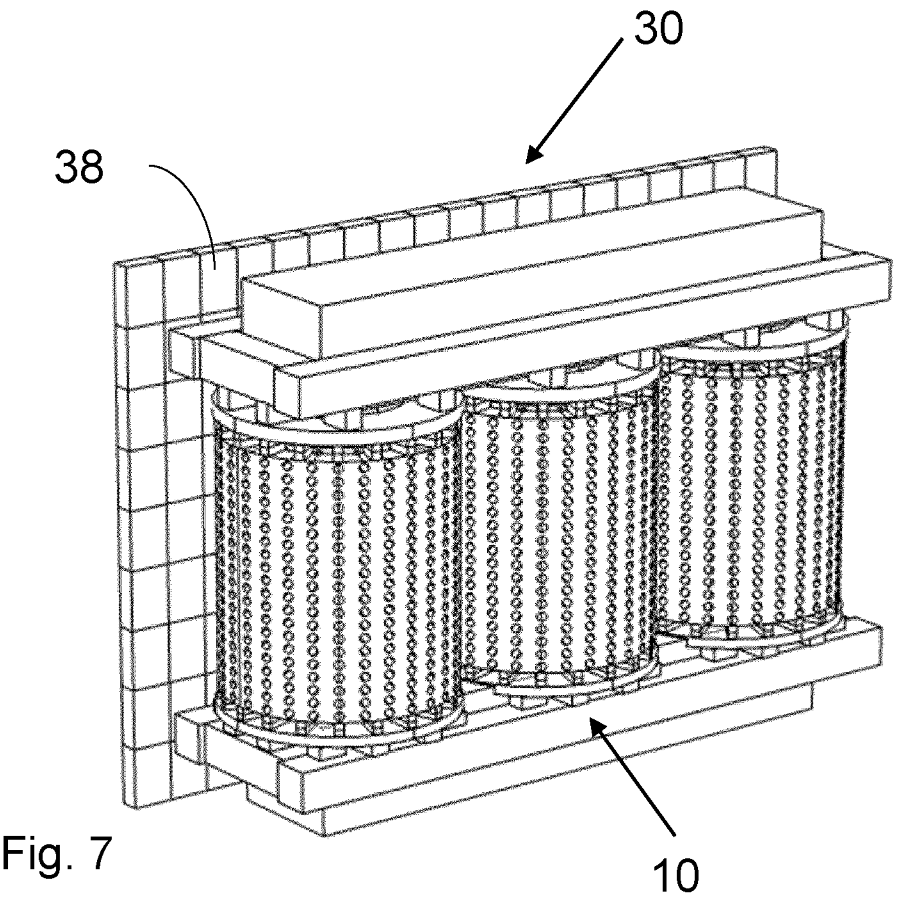
FIG. 7 shows a perspective detail of a screen according to an exemplary embodiment of the present disclosure.

As an alternative, instead of being rigid, the screen 30 may comprise a granular material, such as a heavy lump mass without stiffness but with significant intrinsic damping. The screen may be configured as a plurality of pockets 38, as shown in FIG. 7, which pockets 38 comprise the granular material, such as sand. The exemplary embodiment of FIG. 7 only shows a section of the screen 30. As in the other embodiments, the screen 30 is intended to circumscribe the transformer 10. The granular material should be heavy in relation to the incompressible medium. As an example, where an electrically insulating transformer oil has a density of approximately 870 $kg/m^3$, the granular material may have a density higher than 870 $kg/m^3$, preferably at least 1600 $kg/m^3$.

Such a screen 30, comprising the granular material, may be arranged on the walls 22 of the transformer tank. Accordingly, the screen 30, comprising the granular material, may be arranged on the inside of the walls 22 of the transformer tank. As such, pockets 38 comprising the granular material may be attached to the walls 22 by conventional fixing means, and may be completely covering the walls 22.

The screen 30 may, in addition to being distanced from the at least one phase winding 12 of the transformer 10, also be arranged distanced from the walls 22 of the transformer tank 20. Any of the rigid screen, the compound screen or the granular screen described above may be arranged in the transformer tank 20 distanced from both the at least one phase winding 12 of the transformer 10 and from the tank walls 22. The screen 30 comprising the granular material may be arranged distanced from the tank walls 22 using a support structure (not shown) for suspending the pockets 38, containing the granular material, in the incompressible medium.

The transformer 10 may have a first extension along a first axis z parallel with the coil axis c, a second extension along a second axis x and a third extension along a third axis y. The first, second and third axes are perpendicular to each other. The transformer has lateral sides parallel with the coil axis c.

The screen 30 may have at least one lateral part 32 aligned in the lateral sides of the transformer 10. The at least one lateral part 32 of the screen 30 circumscribes the transformer 10. The at least one lateral part may have a height h along the first axis z. The height h of the at least one lateral part 32 may be equal to a height H of the at least one phase winding 12. In case of multiple lateral parts 32, the sum of the individual heights h may be equal to, or less, than the height H of the at least one phase winding 12. For the purpose of cooling of the at least one phase winding 32, the sum of the heights h of the individual lateral parts may be less than the height H of the at least one phase winding 12.

The transformer 10 may have a first end along the first axis z and an opposite second end along the first axis z. The transformer tank 20 further has a first wall 22' extending transversely to the first axis z and an opposite second wall 22" extending transversely to the first axis z.

As stated in the Summary of the present disclosure, the transformer 10 is defined to have a height equal to a height H of the at least one phase winding 12, which height of the phase winding 12 also includes thicknesses of pressplates 14', 14" arranged at the ends of the phase windings 12. Thus, the first end of the transformer 10 is herein defined as comprising at least one first pressplate 14' of the at least one phase winding 12 and the second end of the transformer 10 is defined as comprising at least one second pressplate 14" of the at least one phase winding 12.

Figure 2:
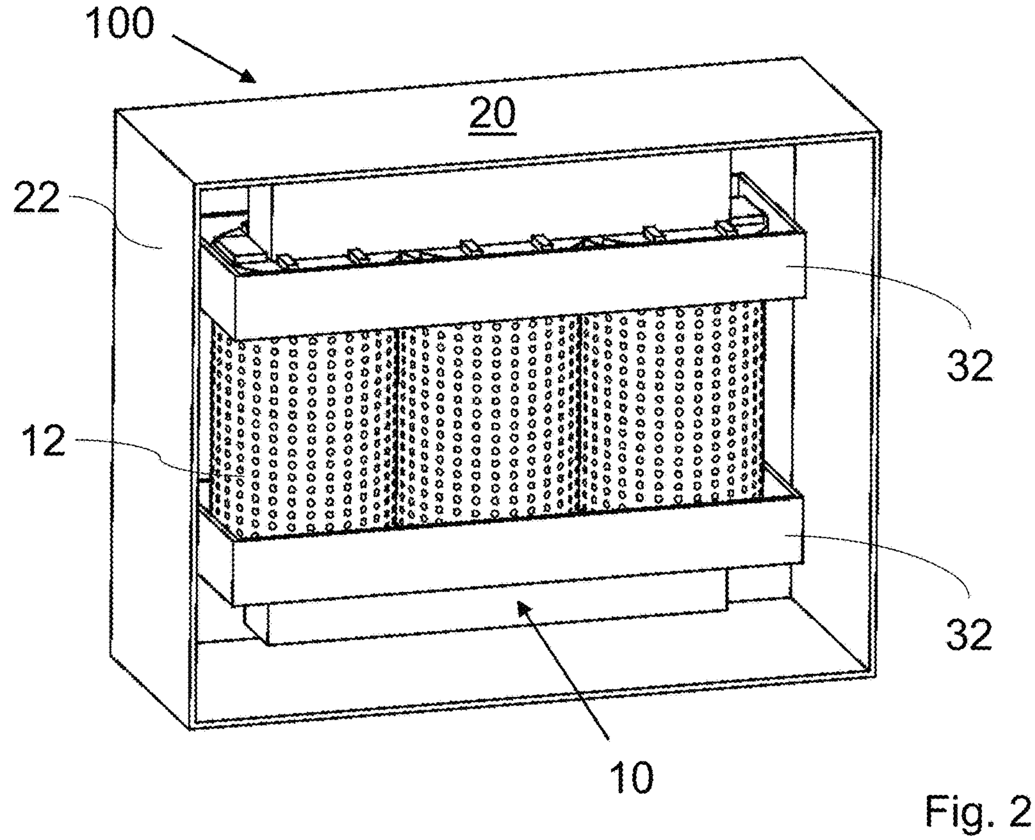
FIG. 2 shows a perspective view of an exemplary embodiment of the present disclosure.

As shown in FIG. 2, the at least one lateral part 32 of the screen 30 may comprise two lateral parts 32. One lateral part 32 is arranged at the first end of the transformer 10 and one lateral part 32 is arranged at the second end of the transformer. Such a configuration may be preferable because it is envisaged that acoustic pressure in the incompressible medium is higher at the ends of the at least one phase winding 12, i.e. in the vicinity of the first pressplate 14' and the second pressplate 14". Therefore, arranging the lateral parts 32 around the first and second ends of the transformer 10 may be an efficient manner of blocking inertia-forces of the incompressible medium while leaving a major part of the at least one phase winding 12 without a screen in order to improve cooling efficiency of the incompressible medium around the at least one phase winding 12.

Figure 3:
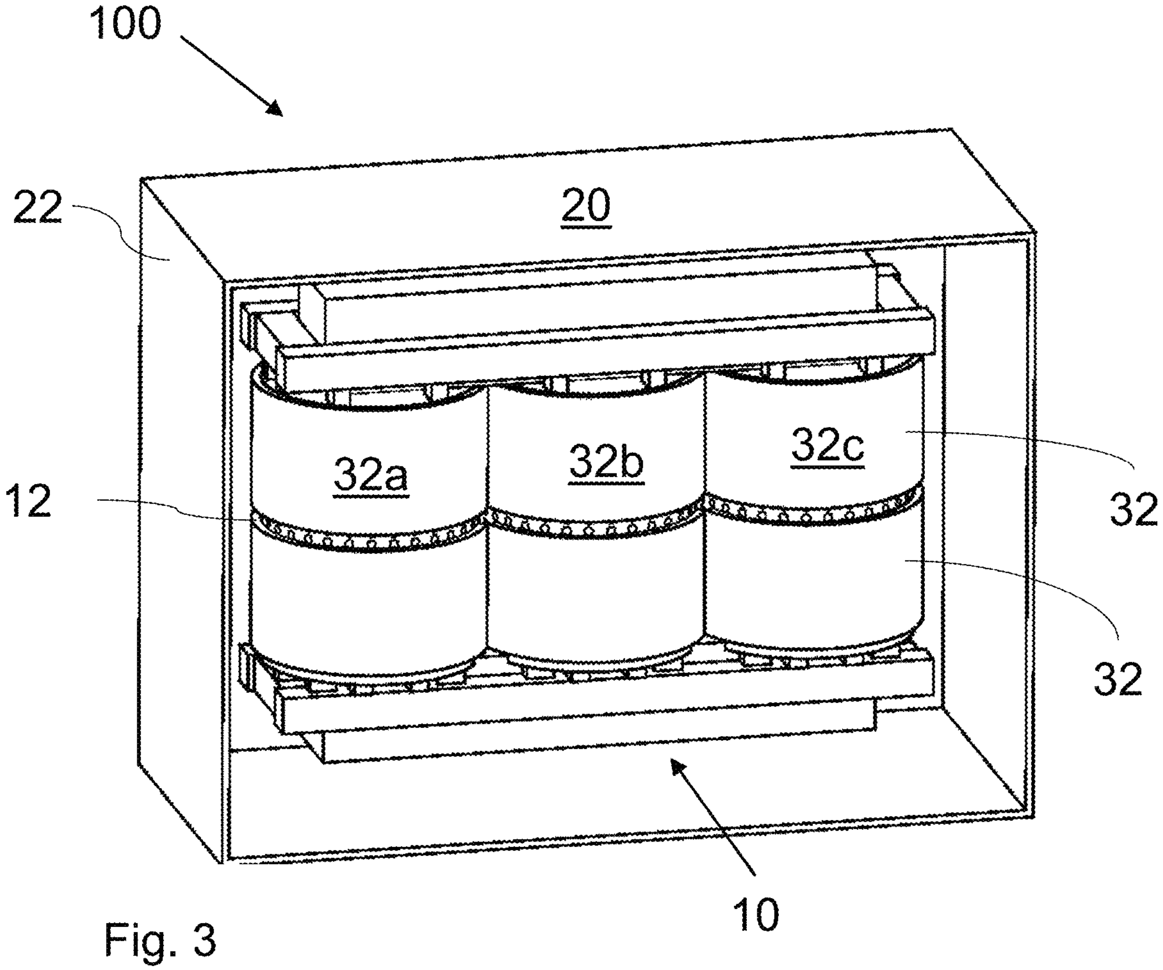
FIG. 3 shows a perspective view of an exemplary embodiment of the present disclosure.
Figure 4:
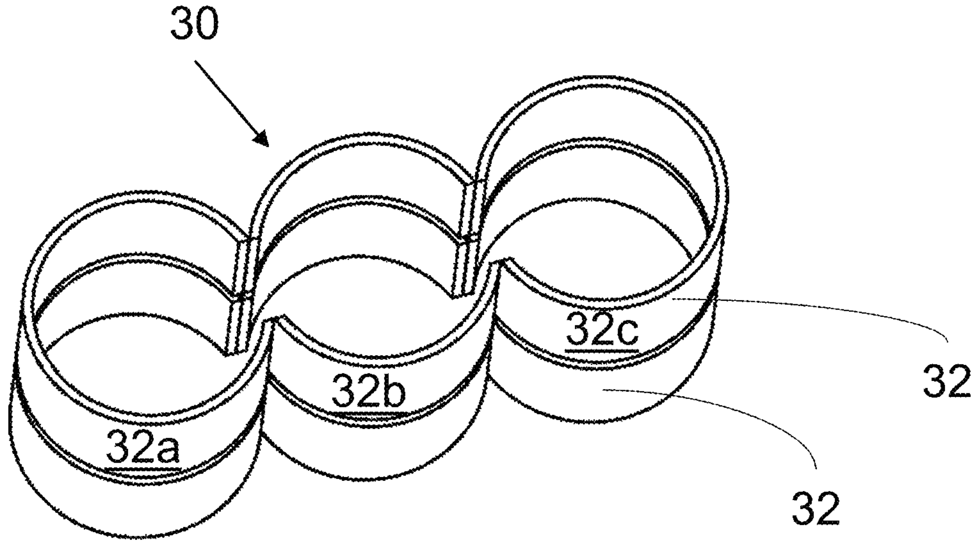
FIG. 4 shows a perspective view of a screen according to an exemplary embodiment of the present disclosure.

FIG. 3 and FIG. 4 show another configuration, where the screen 30 has a close-fitting contour in relation to the at least one phase winding 12. In the depicted example, the screen 30 comprises two lateral parts 32, each comprising three connected tubular parts 32*a*, 32*b*, 32*c* conforming to cylindrical shapes of three phase windings 12. In this manner, the screen 30 is equidistantly, but closely spaced from the at least one phase winding 12 around the circumference of the coil turns, resulting in efficient blocking of inertia-forces of the incompressible medium.

Figure 5:
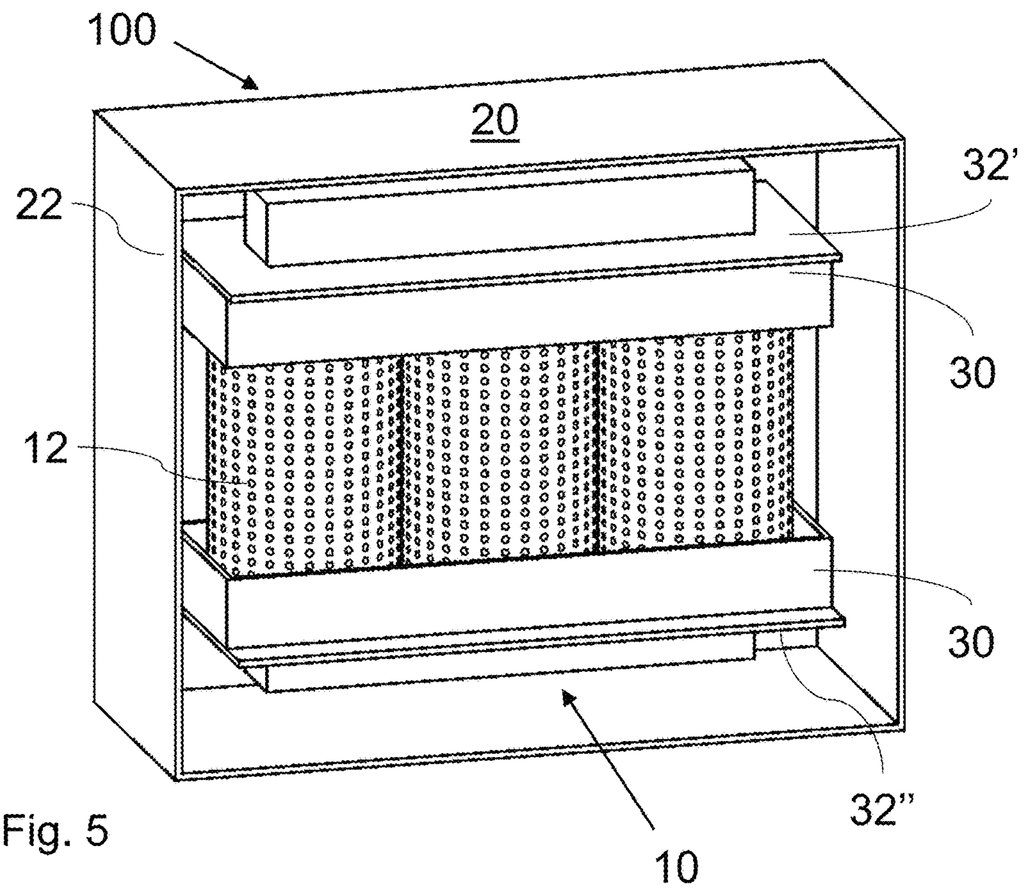
FIG. 5 shows a perspective view of an exemplary embodiment of the present disclosure.

FIG. 5 shows a further configuration of the screen 30, where the screen 30 has at least one first part 32' and at least one second part 32", each extending transversely to the first axis z and wherein the at least one first part 32' is arranged between the first end of the transformer 10 and the first wall 22' of the transformer tank 20 and the at least one second part 32" is arranged between the second end of the transformer 10 and the second wall 22" of the transformer tank 20. Thereby, the screen 30 is configured to cover a larger portion of the transmission path of inertia-forces arising from vibration of the ends of the at least one phase winding 12. If the at least one lateral part 32 and the first part 32' and the second part 32" are applied in combination, the first part 32' and the second part 32" may be mechanically connected, such as welded to lateral parts 32.

The rigid screen, the screen comprising the volumetrically compressible lining 34 and the screen comprising the granular material may all be configured according to the embodiments shown in FIGS. 1-5. However, only the screen comprising the granular material may advantageously be arranged directly on the transformer tank walls 22.

Figure 8:
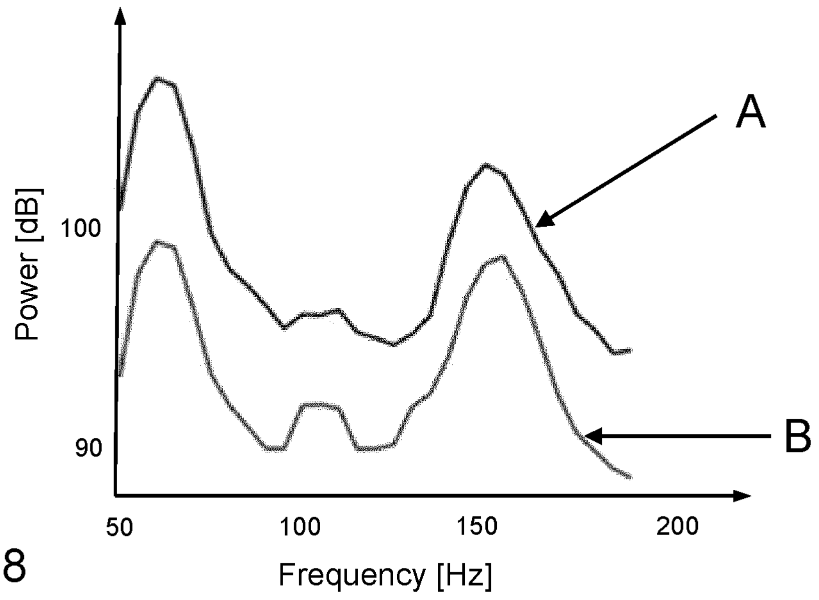
FIG. 8 shows simulated results of an exemplary embodiment of the present disclosure.

FIG. 8, shows simulated results of how acoustic power of a transformer tank varies with frequency. Curve B shows a transformer arrangement 100 according to the present disclosure, having a screen 30 comprising a volumetrically compressible lining 34. Curve A shows a transformer arrangement without a screen, i.e. a conventional transformer arrangement. It can be seen that the screen 30 contributes significantly to load noise reduction.

The invention claimed is:

1. A transformer arrangement comprising:

a transformer comprising at least one phase winding, said phase winding having coil turns around a coil axis, the transformer having a first extension along a first axis parallel with the coil axis, a second extension along a second axis and a third extension along a third axis, said first, second and third axes being perpendicular to each other, and the transformer having lateral sides parallel with the coil axis, a transformer tank having walls forming an enclosure in which said transformer is arranged, said enclosure containing an incompressible medium in which the transformer is immersed, a screen arranged in said transformer tank, between the walls of the transformer tank and the at least one phase winding of the transformer, said screen having an inner, transformer-facing, surface and an outer, wall-facing, surface, the screen being arranged distanced from the at least one phase winding of the transformer, and wherein the transformer has a first end along the first axis and an opposite second end along the first axis, and wherein the transformer tank has a first wall extending transversely to the first axis adjacent to the first end of the transformer and an opposite second wall extending transversely to the first axis, adjacent to the second end of the transformer, wherein the screen has at least one first part and at least one second part, each extending transversely to the first axis and wherein the at least one first part is arranged between the first end of the transformer and the first wall of the transformer tank and the at least one second part is arranged between the second end of the transformer and the second wall of the transformer tank, and wherein the screen has at least one lateral part aligned with the lateral sides of the transformer, and wherein the at least one lateral part of the screen comprises a continuous band that circumscribes the transformer, and wherein the screen is configured to be free from structural resonances at twice a network frequency, wherein the screen is arranged distanced from the walls of the transformer tank, wherein a distance between the inner, transformer-facing, surface of the at least one lateral part of the screen and a closest part of the at least one phase winding of the transformer is less than a distance between the inner, transformer-facing, surface of the at least one lateral part of the screen and a closest part of the walls of the transformer tank.

2. The transformer arrangement according to claim 1, wherein the screen is configured to be-free from structural resonances at twice the network frequency by being rigid, by comprising a volumetrically compressible lining, or by comprising a granular material.

3. The transformer arrangement according to claim 1, wherein the inner surface of the screen comprises a volumetrically compressible lining.

4. The transformer arrangement according to claim 3, wherein the lining has a bulk modulus≤1.7 GPa.

5. The transformer arrangement according to claim 1, wherein the screen comprises a granular material.

6. The transformer arrangement according to claim 5, wherein the granular material has a density of more than 870 kg/m3, or more preferably a density of more than 1600 kg/m3.

* * * * *